US006085113A

United States Patent [19]

Fan

[11] Patent Number: 6,085,113

[45] Date of Patent: Jul. 4, 2000

[54] HAND-FREE HOLDING DEVICE FOR A MOBILE TELEPHONE SET II

[75] Inventor: Eagle Fan, 30 Luchang, Luchang Li, Chupei City, Hsinchu, Taiwan, 302

[73] Assignee: Eagle Fan, Hsinchu, Taiwan

[21] Appl. No.: 09/199,549

[22] Filed: Nov. 25, 1998

[51] Int. Cl.[7] .................. H04M 11/00

[52] U.S. Cl. .................. 455/569; 455/90; 379/486; 379/446

[58] Field of Search .................. 455/569, 90, 128, 455/346, 347, 344; 379/426, 446, 454, 455, 428, 449

[56] References Cited

U.S. PATENT DOCUMENTS

| | | | |
|---|---|---|---|
| 4,383,140 | 5/1983 | Goodman | 379/446 |
| 5,187,744 | 2/1993 | Richter | 379/449 |
| 5,664,012 | 9/1997 | Chen | 379/420 |
| 5,779,205 | 7/1998 | Ching | 248/205.8 |
| 6,009,168 | 12/1999 | Snyder et al. | 379/446 |

*Primary Examiner*—Edward F. Urban
*Assistant Examiner*—Congvan Tran
*Attorney, Agent, or Firm*—Smith, Gambrell & Russell, LLP; Beveridge, DeGrandi, Weilacher & Young Intellectual Property Group

[57] ABSTRACT

A hand-free holding device for mobile telephone set II including a back cover, a front cover, a releasing linkage and a movable piece which are placed between the back and front covers, the releasing linkage has a hook end to engage with a catch which has a wedge bottom and a recess top for a small spring arrangement, and retained by a rib inside the front cover, when the releasing linkage is depressed, the catch will be lifted up for position regulating of the movable piece for different types of mobile telephone sets.

4 Claims, 4 Drawing Sheets

20 201 221 21 10 33 30 23 22 43 411 42 32 321 34 221 413 412 41 313 31 40 311 312

HAND-FREE HOLDING DEVICE FOR A MOBILE TELEPHONE SET II

FIELD OF THE INVENTION

The present invention involves a mobile telephone set, specially a hand-free holding device for mobile telephone set II which features less elements, easy assembling, and perfect holding.

BACKGROUND OF THE INVENTION

With the science and technology developing, people's living standards improving and keen market competition in the modern society the conventional telephone could not meet people's demands and the mobile telephone has become a necessary means in communication.

It can be seen frequently that a driver in a running car makes or takes a phone call with a hand holding a telephone set and another hand holding the steering wheel. It is, absolutely, not convenient and, sometimes, will cause a traffic accident. Therefore, there are different improved designs presented according to different requirements. Generally, they are a fixed holder for the telephone set at a proper position near driver; the traditional fixed holders which are fixed at a certain position are provided with a fixed piece and a movable piece at both sides of the holder for holding the telephone set. However, such movable piece can not provide a satisfactory performance. So, the inventor creates a structure of a holder featuring less elements, easy and stable movable piece setting and perfect holding by means of his accumulated long term experience on manufacture and application in that field.

SUMMARY OF THE INVENTION

The major object of the invention is to provide a hand-free holding device for mobile telephone set II which is arranged separately with a releasing linkage and a catch with a small spring on it, when the catch is actuated by depressing the releasing linkage, the catch will be pushed against a rack of the movable piece to fix it at a desired position firmly by the spring force.

The object of the invention is embodied as following.

A hand-free holding device for mobile telephone set II is characterized by: a front cover with several protrusions on its internal wall for connection of a corresponding back cover, an integrated and shaped convex side with an open space above it and an opening in the side opposite to it, and two sliding guides between the two sides on the internal wall; a releasing linkage which has a hole around which a segmental piece is provided for a torsional spring at its middle part for protrusions inside the front and back covers inserting in it, an end extending from the open space above the shaped convex side, and another end engaging with the catch; a movable piece, L shaped, which is placed in the open side, consists of a sliding part with a rack engaging with the catch and a clamping head which is located at outer side of the front cover corresponding with the shaped convex side to form a clamp, and a recess for a spring, and has a recess for a spring; the said releasing linkage and the said catch are separate and engaged by their hook ends, and a spring is arranged on the catch.

A desired space extent for a telephone set can be obtained by depressing the releasing linkage and changing the position of the movable piece and with the catch engaging on a proper position of the rack.

The object of the present invention can also be embodied further by the following technical measures.

The said catch has a wedge bottom and a recess top, and its movement is limited to up and down by a rib on the internal wall of the front cover.

The object, characteristics and functions of the present invention can be best described in detail in conjunction with the accompanying drawings and the following embodiment hereinafter:

DETAILED DESCRIPTION OF THE INVENTION

Figure 1:
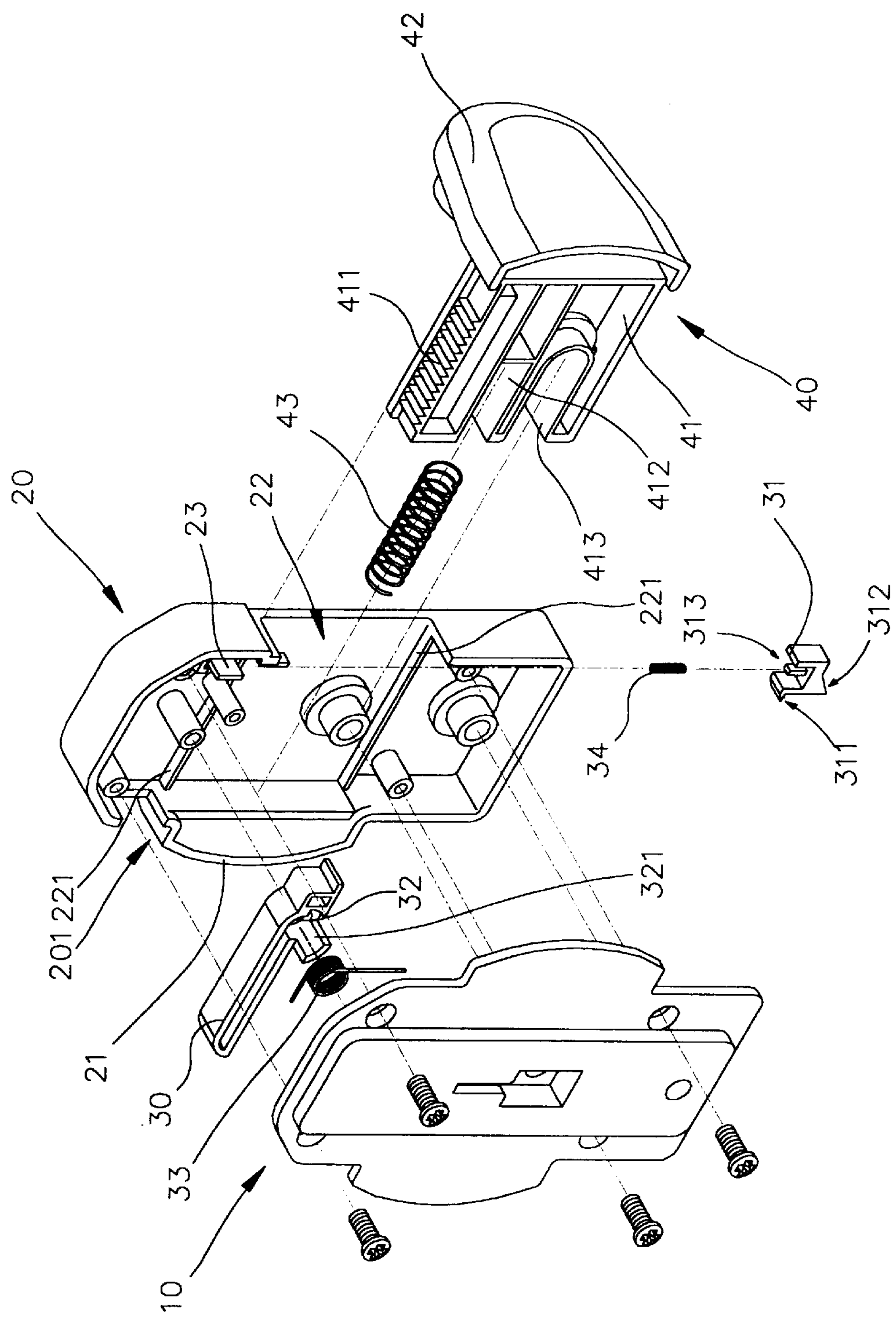
FIG. 1 is a schematic exploded view of the invention.
Figure 2:
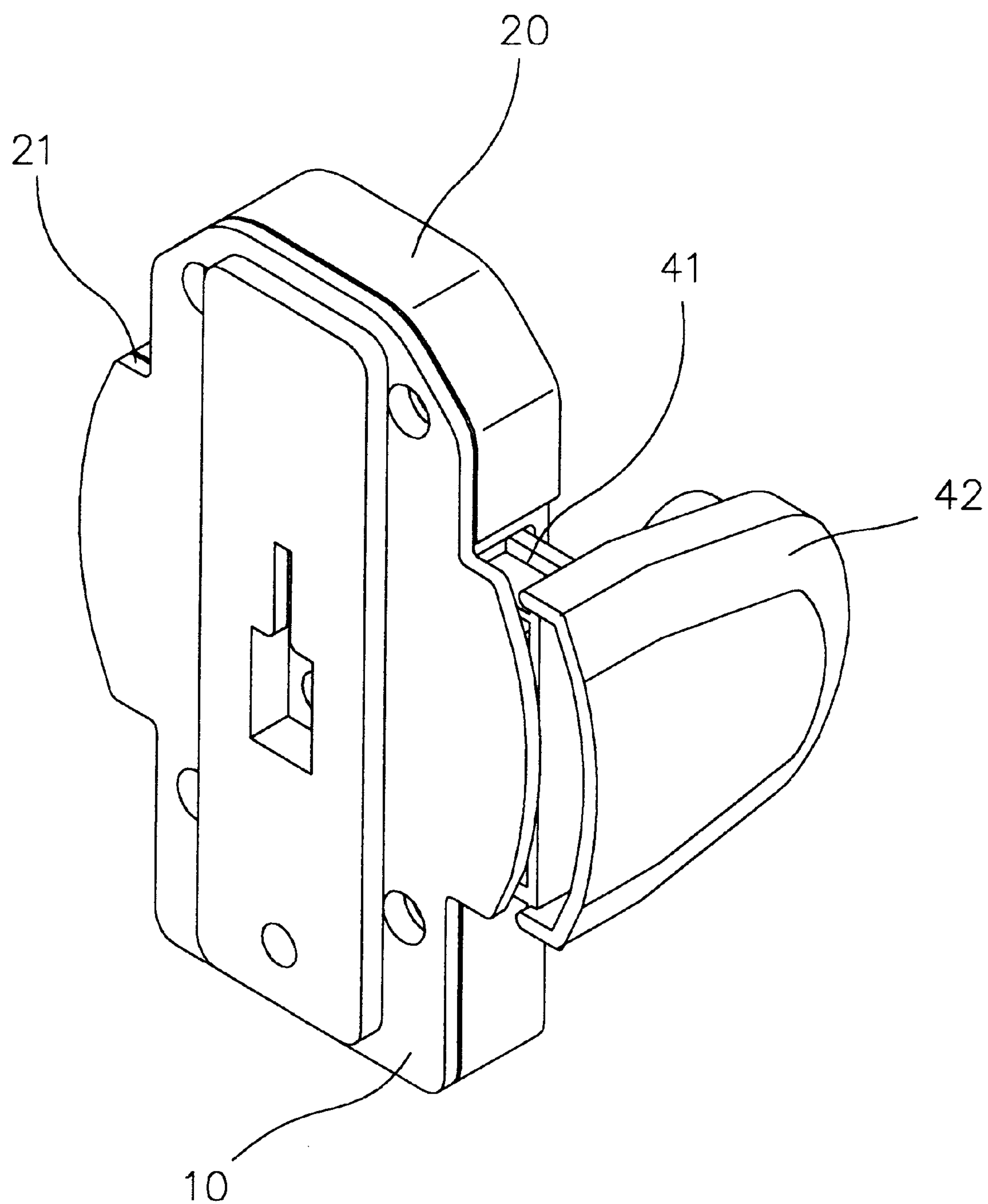
FIG. 2 is a schematic assembled view of the invention.

As shown in FIG. 1, the present invention includes a back cover 10, a front cover 20, a releasing linkage 30, a catch 31 and a movable piece 40, among which the back cover 10 and the front cover 20 are matched and assembled together correspondingly, the front cover 20 has a fixed and shaped side 21 and an open side 22 opposite to the side 21, between the sides 22 and 21 there are two sliding guides 221 for the movable piece 40 inserting. The movable piece 40 is L shaped and consists of a sliding part 41 and a clamping head 42, in which the sliding part 41 is inserted in the open side 22 and the clamping head 42 extends perpendicularly along the outer side of the front cover 20 corresponding to the side 21; the sliding part 41 is provided with a rack 411, a recess 412 which forms a receptacle for a spring 43 together with the internal wall of the front cover 20, and a recess 413 with an arc end which matches a protrusion on the internal wall of the front cover 20, and is retained inside the cover body formed by assembling of the back cover 10 and the front cover 20; the front cover 20 is arranged with a open space 201 above the side 21 for the releasing linkage 30 inserting, the releasing linkage 30 has an end extended outside the cover body through the open space 201 and another end is provided with a hole 32 at its proper position for a protrusion inside the front cover 20. The hole 32 is provided with a segmental piece 321 around its outer edge for a torsional spring 33, the end near the hole 32 is engaged with the catch 31. The catch 31 has a hook end 311 which engages the said end of the linkage 30, a wedge bottom 312 which is engaged with the rack 411, and a recess top 313 for a small spring 34 so that a complete holding device is formed, as shown in FIG. 2.

Figure 3B:
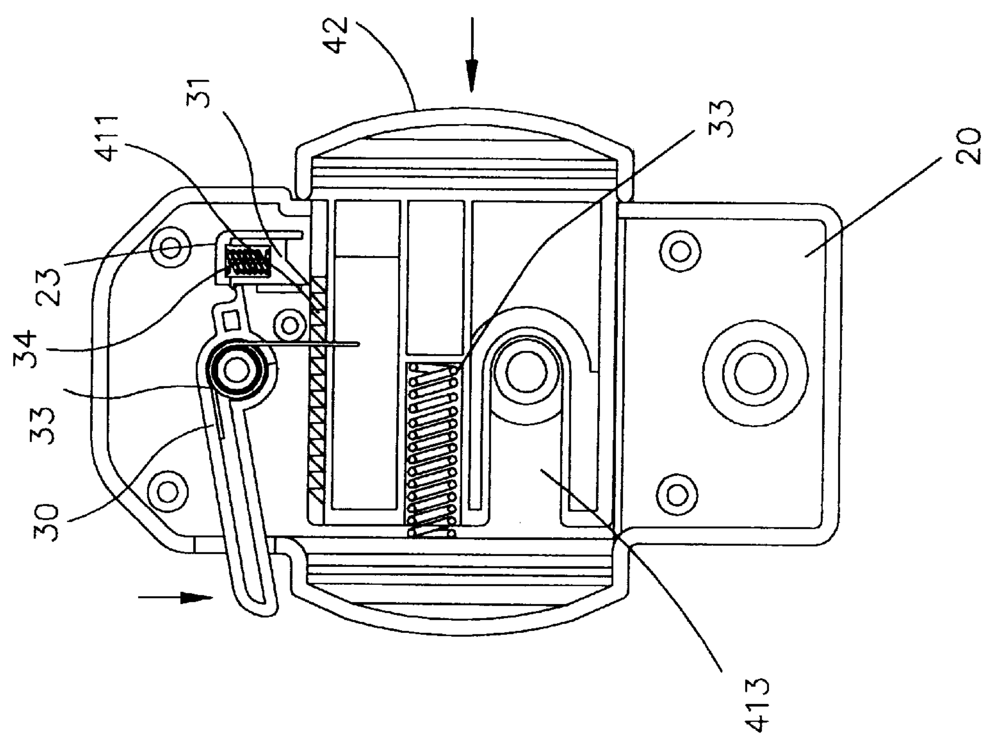
FIG. 3A and 3B is a schematic view of disclosed inside of the invention.
Figure 3A:
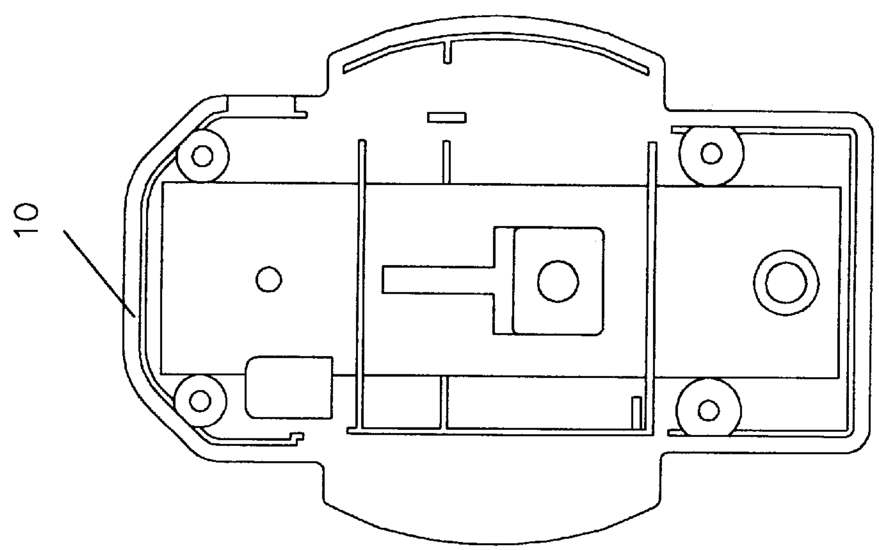
Figure 4:
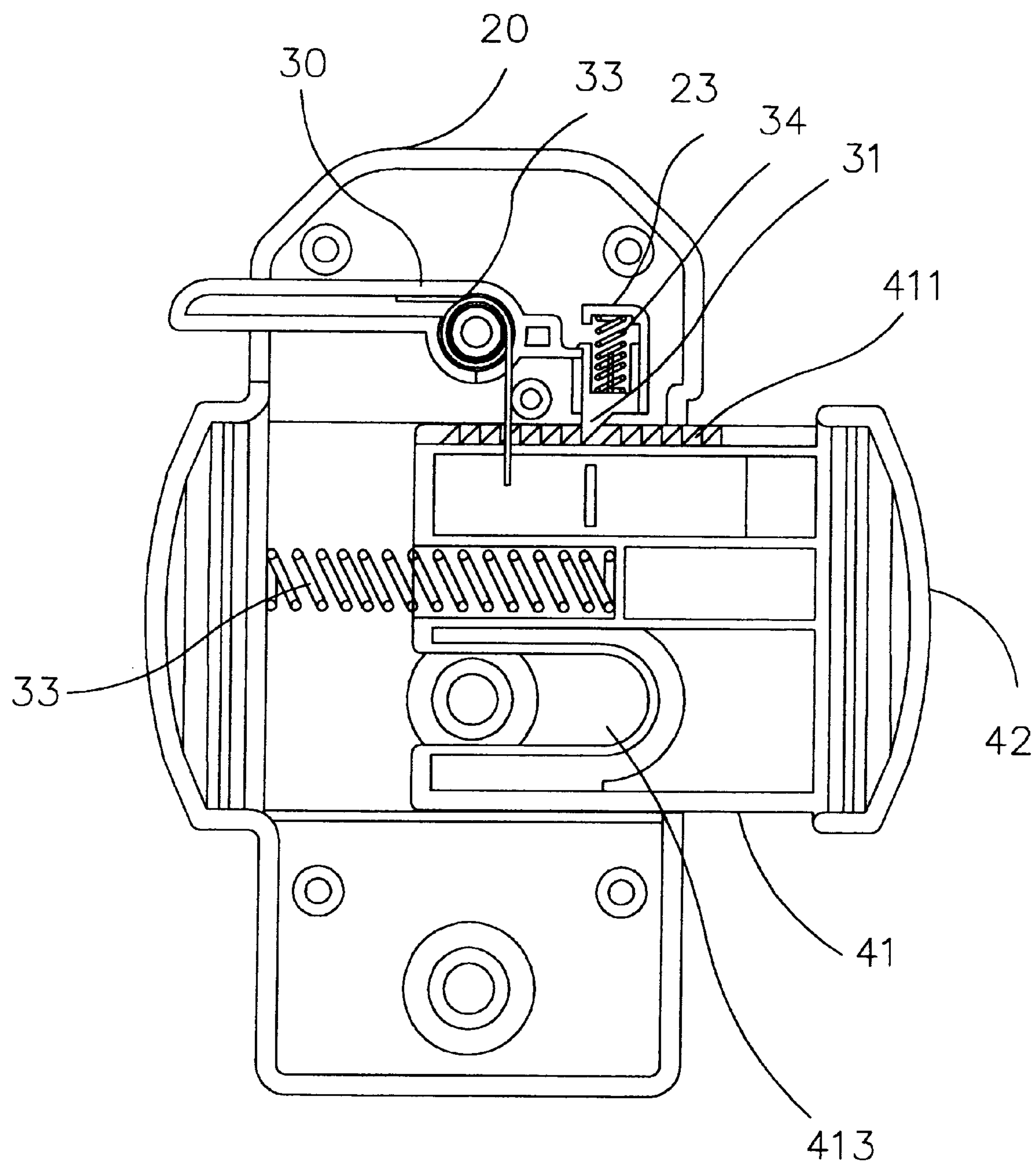
FIG. 4 is a schematic view of operation of the invention.

According to FIG. 3 and FIG. 1, a rib 23 is provided inside the front cover 20, the rib 23 forms a square space for the catch 31 inserting and limits movement of the small spring 34 on the catch 31 in a room between the recess 313 and the rib 23 without offset; with reference to FIG. 4, when the releasing linkage 30 extended from the open space 201 is depressed, it will rotate around the center of the hole 32 to lift the catch 31 at the other end, when the catch 31 is lifted up, its wedge bottom 312 will disengage from the rack 411 making the movable piece possible to move outward or inward. When the movable piece 40 reaches a desired position, remove depression on the releasing linkage 30 making the catch 31 to engage with the rack 411 for positioning the movable piece 40 at the desired space extent. (Telephone set is not shown in the figure). A force from the small spring 34 acts on the catch 31 causing smooth movement of the movable piece 40 when the releasing linkage 30 is depressed, and resulting in firm holding of a telephone set.

As seen according to the above, the present invention ‘Hand-Free Holding Device for Mobile Telephone Set II’ has really practical applicability and creativeness and has never been disclosed in any publication so that it conforms to the regulations stipulated in the Patent Law.

The embodiment mentioned above is only a better example for the present invention, and shall not restrict the range of embodiment of the present invention to it, and any modification or/and change made based on the present invention shall be considered to be covered by the present invention.

What is claimed is:

1. A hand-free holding device for mobile telephone set II, comprising:

a front cover with several protrusions on its internal wall for connection of a corresponding back cover, an integrated and shaped convex side with an open space above it and an opening in the side opposite to it, and two sliding guides between the two sides on the internal wall;

a releasing linkage which has a hole around which a segmental piece is provided for a torsional spring at its middle part for protrusions inside the front and back covers inserting in it, an end extending from the open space above the shaped convex side, and another end engaging with a catch;

a movable piece, L shaped, which is placed in the open side, consists of a sliding part with a rack engaging with the catch and a clamping head which is located at outer side of the front cover corresponding with the shaped convex side to form a clamp and a recess for a spring inserting;

said releasing linkage and said catch are separate and engaged by their hook ends, and a spring is arranged on the catch.

2. A hand-free holding device for mobile telephone set II according to claim 1 is characterized by that the catch has a wedge bottom.

3. A hand-free holding device for mobile telephone set II according to claim 1 is characterized by that the catch has a recess top.

4. A hand-free holding device for mobile telephone set II according to claim 1 is characterized by that the catch is retained by a rib inside the front cover.

* * * * *